United States Patent [19]

Keil

[11] 3,821,168
[45] June 28, 1974

[54] PROCESS FOR THE PREPARATION OF LINEAR POLYAMIDES CONTAINING SULFONATE GROUPS

[75] Inventor: Günter Keil, Lorsbach, Taunus, Germany

[73] Assignee: Farbeverke Hoechst Aktiengesellschaft vormals Meister Lucuis & Bruning, Frankfurt Main, Germany

[22] Filed: May 4, 1972

[21] Appl. No.: 250,375

[30] Foreign Application Priority Data
May 6, 1971 Germany............................ 2122368

[52] U.S. Cl.................. 260/49, 8/178 R, 260/30.2, 260/32.6 N, 260/78 SC
[51] Int. Cl............................................ C08g 20/20
[58] Field of Search................. 260/49, 78 R, 78 SC

[56] References Cited
UNITED STATES PATENTS

| | | | |
|---|---|---|---|
| 3,039,990 | 6/1962 | Huffman | 260/42 |
| 3,142,662 | 7/1964 | Huffman | 260/78 |
| 3,184,436 | 5/1965 | Magat | 260/78 |
| 3,238,180 | 3/1966 | Wiloth | 260/47 |
| 3,574,169 | 4/1971 | D'Alelio | 260/78 |
| 3,663,508 | 5/1972 | Mobius et al. | 260/49 |

Primary Examiner—Lester L. Lee
Attorney, Agent, or Firm—Henry W. Koster

[57] ABSTRACT

The invention relates to filaments, fibers and sheets from linear polyamides containing sulfonate groups as well as to a process for the preparation of these polyamides from aromatic dicarboxylic acid dichlorides and aromatic diamines which may contain small amounts of aliphatic, cyclo-aliphatic dicarboxylic acid dichlorides or mixtures of aliphatic and cyclo-aliphatic dicarboxylic acid dichlorides and diamines, using 2 to 15 mole percent, referred to the total amount of the dicarboxylic acid dihalides, of at least one dicarboxysulfonic acid trichloride of the general formula

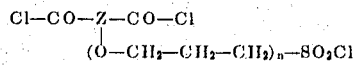

wherein Z represents a trivalent aromatic radical and n represents one of the numbers 0 and 1, by means of polycondensation in solution and subsequent treatment with bases.

The structure formed from these polyamides are distinguished by a high affinity for cationic dyestuffs.

4 Claims, No Drawings

PROCESS FOR THE PREPARATION OF LINEAR POLYAMIDES CONTAINING SULFONATE GROUPS

The present invention relates to a process for the preparation of linear polyamides containing sulfonate groups.

There are known linear fully aromatic and predominantly aromatic polyamides having good fiber-forming capacity and which are distinguished by high thermal stability and low flammability.

Those aromatic polyamides cannot be prepared by polycondensation of salts of aromatic dicarboxylic acids with aromatic diamines, it being convenient to start from dicarboxylic acid dichlorides and diamines. Preferred methods are the bi-phase condensation or the low temperature polycondensation in solution. These bi-functional acylation methods are described for example in U.S. Pat. Nos. 3,006,899 and 3,063,966.

Highest molecular weights are obtained when the reaction of aromatic dicarboxylic acid dichlorides with aromatic diamines is realized in N-alkylated carboxylic acid amides, such as dimethylacetamide or N-methylpyrollidone at temperatures in the range of from −30°C to +30°C.

Due to their dense structure and high second order transition temperature, aromatic polyamides can only insufficiently be dyed with so-called dispersion dyestuffs. Therefore, there are incorporated substances with sulfonate groups into these polyamides which confer a better affinity for cationic dyestuffs.

U.S. Pat. No. 3,184,436 describes for example the modification of polyamides with diaminosulfonic acids or discarboxysulfonic acids and their salts.

U.S. Pat. No. 3,506,990 covers the dyeing of copolymers from m-phenylene-isophthalamide or N,N'-m-phenylene-bis-(m-aminobenzamide)-isophthalamide with 2,4-diaminobenzene sulfonate as co-component.

Now it has been discovered that linear fully-aromatic or predominantly aromatic polyamides containing sulfonate groups and which are easily dyeable with cationic dyestuffs can be obtained in a particularly advantageous way by means of polycondensation in solution of aromatic dicarboxylic acid dichlorides and aromatic diamines which may contain small amounts of aliphatic and/or cyclo-aliphatic dicarboxylic acid chlorides and diamines, with sulfur-containing comonomers and by means of a subsequent treatment with a base, when employing as sulfur-containing comonomers 2–15 mole percent referred to the total amount of the dicarboxylic acid chlorides, of one or several dicarboxysulfonic acid trichlorides of the general formula

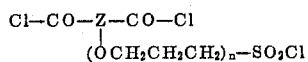

in which Z represents a trivalent aromatic radical which is derived for example from benzene, naphthalene or diphenyl, and $n$ represents the numbers 0 to 1.

The linear polyamides containing sulfonate groups prepared according to the process of the invention are especially suited for the manufacture of fibers, filaments and sheets.

It is extremely surprising that the co-polycondensation of aromatic dicarboxylic acid dichlorides and aromatic diamines with the above trifunctional dicarboxysulfonic acid trichlorides does not yield cross-linked polymers but, on the contrary, does produce soluble, spinnable polymers having affinity for cationic dyestuffs. It is known from German Pat. No. 916,226 that disulfochlorides with diamines in N-alkylated amides yield polysulfonamides. Moreover, U.S. Pat. No. 3,380,969 mentions the possibility to realize the co-polycondensation of discarboxylic acid dichlorides and diamines with disulfonic acid dichlorides by means of the bi-phase condensation or the polycondensation in solution.

Compared with known comonomers which have an affinity for cations, the dicarboxysulfonic acid trichlorides used according to the invention offer the advantage of an easy accessibility, low prices and simple handling. They are obtained in an easy way by chlorinating in the usual manner the corresponding dicarboxysulfonic acids with thionyl chloride — possibly in the presence of catalytic amounts of dimethylformamide — and then purifying the reaction products by distillation or crystallization.

Typical comonomers used according to the invention are 5-sulfoisophthalic acid trichloride, sulfoterephthalic acid trichloride, naphthalic acid-3-sulfonic acid trichloride, 4,4'-diphenyl dicarboxylic acid-2-sulfonic acid trichloride and 5-sulfopropoxy-isophthalic acid trichloride.

The polycondensation in solution with the comonomers employed according to the invention is carried out in a known manner as is customary for the preparation of aromatic polyamides having high molecular weight.

For this purpose, the aromatic amines (e.g., 4,4'-diamino-2,2'-dimethyldiphenyl, 4,4'-diaminodiphenylmethane, 4,4'-diaminodiphenylethane, 4,4'-diaminobenzophenone, 4,4'-diaminodiphenyl ether, 4,4'-diaminodiphenyl sulfide, 4,4'-diaminodiphenyl sulfone, or 1,5-diaminonaphthalene, particulary m-phenylenediamine) are dissolved in an amide solvent (e.g., N,N-dimethyl-acetamide, N-methylpyrollidone or tetramethyl urea). The equivalent amount, referred to the amino groups of the aromatic amines, of aromatic dicarboxylic acid dichlorides (for example, 1,4-naphthalene-dicarboxylic acid chloride, 1,4-diphenyldicarboxylic acid dichloride, 1,3-diphenoxypropane-4,4'-dicarboxylic acid dichloride, 5-methylisophthalic acid chloride, 5-tert.butylisophthalic acid chloride, especially isophthalic- and terephthalic acid chloride) and 2 to 15 mole percent of a dicarboxysulfonic acid trichloride of the above formula are then added at temperatures which are preferably in the range of from about −20°C and +10°C.

It is also possible to replace up to about 10 mole percent of the aromatic dichlorides and diamines by aliphatic and/or cycloaliphatic dichlorides or diamines (for example, adipic acid chloride, sebacic acid chloride, or 1,4-cyclo-hexanedicarboxylic acid chloride, ethylene diamine, tri- and tetramethylene diamine or 1,4-cyclo-hexanedimethylamine). When attaining the desired polycondensation degree, the polymer solution is subjected to a treatment with a base in order to neutralize the hydrochloric acid formed, preferably with basic inorganic compounds of the first or second group of the Periodic Table (e.g., LiOH or Ca (OH)$_2$). During this treatment, the sulfochloride groups which are present in the polymer are converted into alkali metal or alkaline earth metal sulfonate groups. Thus, the polymer contains structural units having the following structure:

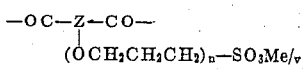

in which Z and n have the meaning as indicated in the formula for the sulfur-containing comonomers employed according to the invention, Me represents the ion of a metal of the first or second group of the Periodic Table and v represents the valency of the cation.

The polymer can be isolated by pouring the polymer solution into a precipitating agent (for example water). The product is washed until it is free from inorganic salts and then dried. In order to produce textile filaments, the polymer is dissolved in a solvent which is appropriate for the dissolution of aromatic polyamides and is then spun according to a wet- or dry spinning process usual for the spinning of aromatic polymaides. The polymer solutions may also be directly spun according to such a wet- or dry spinning process without prior precipitation.

The filaments which are drawn and thermo-set according to known methods show a strong affinity for cationic dyestuffs.

For the dyeing of the polyamides containing sulfonate groups prepared according to the invention, the alkali metal cations or alkaline earth metal cations Me of the sulfonate groups are exchanged for the dyestuff cations F, which results in the formation of chain links of the following structure:

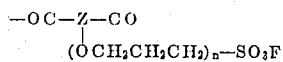

in which Z and n have the above meanings. The cationic dyestuff is consequently combined with the polymer by an ionic bond.

The process according to the invention is illustrated in greater detail by the following examples, where parts mean parts by weight. The inherent viscosity $\eta inh$ is defined by the equation: $\eta inh = 1/c \, 1 \, n \, \eta rel$ and is determined with 0.5 percent solutions in concentrated sulfuric acid at 25°C.

EXAMPLE 1

250 g of 5-sulfo-isophthalic acid were boiled for 5 hours under reflux with 1,250 ml of thionyl chloride. During boiling, a total of 25 ml of dimethylformamide were gradually added. The excessive thionyl chloride was distilled from the limpid, light-yellow solution and the residue was fractionated under reduced pressure. At a boiling point $Kp_{2.5}$ 150° – 151°C, 195.3 g of 5-sulfoisophthalic acid trichloride were distilled. Upon cooling, the yellowish oil crystallized and melted at 42.5°C.

106.8 g of m-phenylene diamine were dissolved under a nitrogen blanket in 935 ml of dimethylacetamide and the solution was cooled to −22°C. 190.4 g of molten isophthaloyl chloride were added dropwise during 30 minutes to this solution, the temperature being maintained beneath 0°C.

Then, 14.9 g of 5-chlorosulfonyl-isophthaloyl chloride (5 mole percent) were introduced. Stirring was continued for 45 minutes at a temperature of from −5° to +3°C and for 60 minutes at a temperature of about +15°C. Then, 74.5 g of Ca(OH)$_2$ were added, while cooling. The polymer was precipitated by pouring its solution into water. The polymer was washed during 90 minutes at 60°C (the water being renewed 5 times) until it had a residual ash content of 0.04 percent and was then dried at 120°C under reduced pressure.

The polyamide contained 0.62 percent of sulfur and showed an inherent viscosity of 1.65.

A 21 percent solution of the product was prepared in dimethylacetamide which contained 2 percent of CaCl$_2$. This solution was extruded as filaments into an aqueous coagulation bath containing CaCl$_2$ and dimethylacetamide. The filaments were drawn to 5 times their original length and set at 290°C. The filaments had a tensile strength of 3.7 g/dtex, an elongation at break of 40.3 percent and a brightness (remission) of 77.6 percent.

In order to remove the preparation, the filaments were washed at 50°C during 30 minutes in a solution containing 0.5 percent of soap and 0.2 percent of soda. 5 Parts of the fibrous material prewashed in the manner described were dyed during 1 hour at 125°C under corresponding steam pressure in a bath containing the following components:

200 Parts of water, 0.1 part of 30 percent acetic acid and 0.1 part of a cationic dyestuff of the following type. The filaments thus treated showed dark shades; they were washed for 10 minutes at 60°C with a non ionic detergent of the ethyleneoxidepolyaddition product type. The shades exhibited an excellent fastness to wet processing as well as stability to rubbing.

Instead of dyeing under pressure at 125°C, it was also possible to dye at a temperature of 100°C. But in this case, it was necessary to add 0.1 to 0.5 percent of a carrier to the dyeing bath. Appropriate carriers are for example, alkyl-aromatic substances, chloro-aromatic substances, phenols or esters. As cationic dyestuffs, the following products are suitable, for example:

C.I. Basic Violet 7; No. 48020
C.I. Basic Red 25; Supplement, page 162
C.I. Basic Red 29; Supplement, page 163
C.I. Basic Red 22; Supplement, page 161
C.I. Basic Violet 20; Supplement, page 167
C.I. Basic Yellow 13; C.I., page 1622
C.I. Solvent Green 1; No. 42000 B
C.I. Basic Blue 54; Supplement, page 175
C.I. Basic Blue 40; Supplement, page 172
(C.I. = Colour index, second edition 1956; Supplement 1968).

EXAMPLE 2

107.7 g of m-phenylene diamine were dissolved in 944 ml of dimethylacetamide under a nitrogen blanket and cooled to −20°C. 182 g of molten isophthaloyl chloride were added dropwise during 35 minutes and at a temperature in the range of from −20°C to −2°C. 30 g of 5-chlorosulfonyl-isophthaloylchloride (10 mole percent) were added during 8 minutes at a temperature of from −2°to +8°C. The whole was diluted with another 200 ml dimethylacetamide and polycondensation was terminated after 105 minutes at a temperature of from −5° to +5°C. For neutralization of the hydrochloric acid and for the reaction of the sulfochloride groups, 77.6 g of Ca(OH)$_2$ were introduced while stirring and the polymer was precipitated by pouring it into water. The polymer was washed until it was free from salts and then dried. The product contained 1.0 percent of sulfur and showed an inherent viscosity of 1.50.

The product was dissolved in a 2 percent CaCl$_2$-dimethylacetamide solution (22 percent of polymer), extruded as filaments into an aqueous, calcium-chloride containing coagulation bath, drawn to 3.4 times its original length and set at 300°C. A bundle of filaments was obtained which showed a total titre of 54.2 dtex, a tensile strength of 3.0 g/dtex, an elongation at break of 39.9 percent and a brightness (remission) of 73.0 percent.

Dyeings with cationic dyestuffs were effected in analogy with Example 1. The shades obtained were very deep.

EXAMPLE 3

According to the method described in Example 1, 2-sulfoterephthalic acid trichloride was obtained as a yellowish, viscous substance of a boiling point KP$_{1,2}$ 155°C from sulfoterephthalic acid and thionyl chloride.

107.6 g of m-phenylene diamine were dissolved in 950 ml of dimethylacetamide. During 20 minutes and at a temperature beneath −1°C, first 192.0 g of molten isophthaloyl chloride and then 15.0 g of sulfoterephthalic acid trichloride were added dropwise. Reaction was completed first for three hours at about 0°C and then for two hours at about +20°C. The whole was neutralized with 75.0 g of Ca(OH)$_2$, the polymer was precipitated with water, washed until it was free from salts and dried. The product contained 0.57 percent of sulfur and showed an inherent viscosity of 0.92.

The polymer could be easily spun from a solution of dimethylacetamide/CaCl$_2$. Cationic dyestuffs conferred to the filaments deep shades which were wash-proof and fast to rubbing.

EXAMPLE 4

7.95 g of Na were reacted in 500 ml of anhydrous methanol. In this reaction solution, 72.0 g of 5-hydroxyisophthalic acid dimethyl ester and 42.0 g of 1,3-propanesultone were dissolved. The whole was boiled for 2 hours under reflux. During cooling, 55.5 g of 5-[3-(sodiumsulfo)-propoxi]-isophthalic acid dimethyl ester crystallized.

141.6 g of 5-[3-(sodiumsulfo)-propoxi]-isophthalic acid dimethyl ester were boiled for 4 hours under reflux in a solution of 32 g of NaOH in 500 ml of water. After cooling, the whole was acidified with concentrated hydrochloric acid, the solution was concentrated to dryness under reduced pressure and the residue was dried in vacuo.

181 g of the sodium chloride containing residue were boiled for 12 hours under reflux with 400 ml of thionyl chloride. The sodium chloride was filtered off and the filtrate was concentrated to dryness. The residue was recrystallized from benzene/n-hexane an thus, 91 g of 5-[3-(chlorosulfonyl)-propoxi]-isophthalic acid dichloride having a melting point of 79°C were obtained.

96.6 g of m-phenylene diamine were dissolved in 850 ml of dimethylacetamide. The solution was cooled to −18°C and 172.5 g of molten isophthaloyl chloride were added dropwise, the temperature being kept below 0°C. 16.1 g of 5-[3-(chlorosulfonyl)-propoxi]-isophthalic-acid chloride (5 mole percent) were added, the whole being stirred for 2 hours at a temperature in the range of from −3°to +5°C and for 2 hours at about 20°C. Then, 68.0 g of Ca(OH)$_2$ were stirred in and the polymer was precipitated by pouring the solution into water. Washing and drying was effected as described in Example 1. The product contained 0.60 percent of sulfur and showed an inherent viscosity of 1.15.

This polymer was dissolved in a 2 percent CaCl$_2$-dimethylacetamide solution (23 percent of polymer) and extruded as filaments into a water-containing coagulation bath. The filaments were drawn to 2.94 times their original length and set at 270°C. A bundle of filaments was obtained having a total tire of 99.6 dtex, a tensile strength of 2.2 g/dtex, an elongation at break of 25.7 percent and a brightness (remission) of 68.7 percent.

Dyeings with cationic dyestuffs at 125°C without carrier or at 100°C with carrier effected in analogy to the method described in Example 1, yielded deep and wash-proof shades.

EXAMPLE 5

A solution of 113.6 g of m-phenylene diamine in 1,000 ml of tetramethyl urea was cooled to −12°C. 202.8 g of isophthaloyl chloride and 15.85 g of 5-chlorosulfonyl isophthaloyl chloride were added in the form of a melt, while the temperature did not exceed +4°C. Stirring was continued first for 1 hour at a temperature in the range of from −4° and +5°C and then for 2 hours at about 20°C. The whole was neutralized with 79.8 g of Ca(OH)$_2$, the polymer was precipitated with water, washed until it was free from salts and dried at 120°C. The product contained 0.60 percent of sulfur and showed an inherent viscosity of 1.14.

It could be easily spun by wet spinning from dimethylacetamide/CaCl$_2$, the filaments exhibiting a high affinity for cationic dyestuffs.

EXAMPLE 6

104.7 g of m-phenylene diamine were dissolved in 920 ml of N-methylpyrollidone. 186.9 g of isophthaloyl chloride and 14.6 g of 5-chlorosulfonyl isophthaloyl chloride were added to this solution at a temperature in the range of from −14°C to −4°C, stirring being continued first for 50 minutes at about 0°C and then for 60 minutes at about 20°C. The whole was neutralized with 48.0 g of LiOH, the polymer was precipitated with water, washed until it was free from salts and dried. The product contained 0.70 percent of sulfur and showed an inherent viscosity of 0.90.

The product was spun from dimethylacetamide/CaCl$_2$. The filaments had great affinity for cationic dyestuffs and the shades were wash-proof.

EXAMPLE 7

199.0 g of molten isophthaloyl chloride were poured drop-wise into a solution of 105.9 g of m-phenylene diamine in 930 ml of dimethylacetamide at a temperature in the range of from −16° to −4°C. When the reaction heat had nearly abated and the solution had turned viscous, the whole was diluted with 200 ml of dimethylacetamide, 10.95 g of 4,4′-diaminodiphenylethane were dissolved in the reaction mixture and then 15.55 g of 5-sulfoisophthalic acid trichloride were added.

Reaction was continued for 1 hour at a temperature in the range of from +2° to +4°C and the reaction mixture was neutralized with 78.0 g of Ca(OH)₂. The polymer was precipitated with water, washed until it was free from salts and finally dried. It contained 0.60 percent of sulfur and showed an inherent viscosity of 1.44.

By means of wet-spinning of this polyamide from dimethylacetamide/CaCl₂, filaments were obtained which could be dyed in very deep shades with cationic dyestuffs. Dispersion dyestuffs such as C.I. Disperse-Orange 32; Supplement, page 190 and C.I. Disperse-Blue 56; Supplement, page 213 yielded medium-deep shades.

EXAMPLE 8

20.2 g of LiCl and 54.7 g of m-phenylene diamine were dissolved in 810 ml of N-methylpyrollidone. At a temperature in the range of from −10° to −6°C, first 97.7 g of terephthaloyl chloride and then 7.6 g of 5-sulfoisophthalic acid trichloride were added. Reaction was continued first for 2 hours at a temperature in the range of from −6° to −11°C and then for 6 hours at about +22°C, neutralization being effected by addition of 25.0 g of LiOH. The polymer was precipitated, washed until it was free from salts and dried.

The polymer contained 0.76 percent of sulfur and showed an inherent viscosity of 1.54.

It could be easily spun from a solution of dimethylacetamide/N-methyl-pyrollidone/LiCl. The filaments could be well dyed with cationic dyestuffs.

EXAMPLE 9

111.0 g of m-phenylene diamine were dissolved in 975 ml of dimethylacetamide. 158.8 g of isophthaloyl chloride, 39.5 g of terephthaloyl chloride and then 15.5 g of 5-chlorosulfonylisophthaloyl chloride were added to this solution at a temperature in the range of from −11° to −6°C. Viscosity did largely increase. The whole was diluted with 250 ml of dimethylacetamide, reaction was continued first for 1 hour at −4°C and then for 4 hours at about 20°C, neutralization was effected with 78.1 g of Ca(OH)₂ and the polymer was precipitated with water. It was washed until it was substantially free from salts and dried. It showed an inherent viscosity of 1.47 and a sulfur content of 0.70 percent.

The product was spun from dimethylacetamide-CaCl₂, drawn and set. The filaments showed deep shades which were washproof when dyed with cationic dyestuffs.

EXAMPLE 10

104.1 g of m-phenylenediamine and 13.85 g of 4,4'-diaminodiphenyl ether dihydrochloride were dissolved in 950 ml of dimethylacetamide under a nitrogen blanket. Then, 195.6 g of isophthaloyl chloride and 15.3 g of sulfoisophthalic acid trichloride were added at a temperature in the range of from −10° to +3°C within 30 minutes. Stirring was continued first for 45 minutes at −5°C and then for 135 minutes at about +10°C and the whole was reacted with a suspension of 77.0 g of Ca(OH)₂ in dimethylacetamide. The polymer was precipitated in the usual manner, washed until it was free from salts and dried. The product contained 0.62 percent of sulfur and showed an inherent viscosity of 1.23.

Wet-spinning of this polyamide from dimethylformamide/LiCl produced filaments which exhibited deep and wash-proof shades when dyed with cationic dyestuffs.

EXAMPLE 11

102.1 g of m-phenylenediamine were dissolved in 950 ml of dimethylacetamide under a nitrogen blanket. Within 20 minutes, 192.0 g of molten isophthaloyl chloride were added to this solution at about −7°C. When the reaction mixture had turned viscous, it was diluted with 400 ml of dimethylacetamide and at a temperature in the range of from 7° to 13°C, 10.55 g of 4,4'-diaminobenzophenone and 15.02 g of 5-sulfoisophthalic acid trichloride were added. Reaction was continued for 2 hours at about 10°C and neutralization was effected with 75.5 g of Ca(OH)₂. The polymer was precipitated in the usual manner, washed until it was free from salts and dried.

It contained 0.66 percent of sulfur and showed an inherent viscosity of 1.80.

The product could be wet- or dry-spun into filaments which exhibited high affinity for cationic dyestuffs.

EXAMPLE 12

181.7 g of isophthaloyl chloride, then 12.9 g of 5-tert.-butyl-isophthaloyl chloride and finally 15.0 g of 5-sulfoisophthalic acid trichloride were added to a solution of 107.4 g of m-phenylenediamine in 950 ml of dimethylacetamide within 25 minutes at a temperature in the range of from −15° to −7°C. Reaction was continued for 110 minutes at about +5°C, then the whole was diluted with 300 ml of dimethylacetamide and reacted with 75.0 g of Ca(OH)₂. After the usual working-up, a polymer was obtained which contained 0.60 percent of sulfur and showed an inherent viscosity of 1.52.

Solutions of this polymer in dimethylformamide, dimethylacetamide, N-methylpyrrolidone or N-methylcaprolactam with addition of CaCl₂ or LiCl, could be easily spun by means of wet-spinning. The filaments obtained showed high affinity for cationic dyestuffs. When dyed with dispersion dyestuffs they exhibited medium-toned shades (v. Example 7).

EXAMPLE 13

183.3 g of molten isophthaloyl chloride, 9.1 g of adipic acid dichloride and then 15.15 g of 5-sulfoisophthalic acid trichloride were introduced into a solution of 108.3 g of m-phenylene diamine in 950 ml of dimethylacetamide at a temperature in the range of from −5° to +5°C. The viscosity of the reaction mixture was rapidly increasing. After 1 hour, the whole was diluted with 400 ml of dimethylacetamide and neutralized with 76.0 g of Ca(OH)₂. The polymer obtained in the usual way contained 0.67 percent of sulfur and showed an inherent viscosity of 1.91.

The product could be easily spun by means of wet- or dry-spinning. The filaments obtained showed a high affinity for cationic dyestuffs.

I claim:

1. A process for the preparation of fiber- and film-forming linear, predominantly aromatic polyamides by polycondensation in the presence of 2 to 12 mole percent, referred to the total amount of dicarboxylic acid dichlorides, of at least one dicarboxysulfonic acid trichloride of the formula

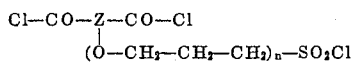

wherein Z represents a trivalent aromatic radical and $n$ represents 0 and 1, and subsequently treating said polyamide with a basic inorganic compound of the first or second group of the Periodic Table.

2. The process as claimed in claim 1, wherein the basic inorganic compound is LiOH.

3. The process as claimed in claim 1, wherein the basic inorganic compound is Ca(OH)$_2$.

4. A linear polyamides of aromatic dicarboxylic acid dichlorides and aromatic diamines which may contain up to 10 mole percent of aliphatic, cycloaliphatic dicarboxylic acid dichlorides or mixtures of aliphatic and cycloaliphatic dicarboxylic acid dichlorides and diamines as precursors thereof, containing from 2 to 12 mole percent referred to the total amount of dicarboxylic acid dichlorides recurrent units of the formula

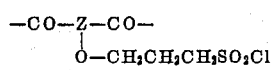

in which Z is a trivalent aromatic radical.

* * * * *

UNITED STATES PATENT OFFICE
CERTIFICATE OF CORRECTION

Patent No. 3,821,168     Dated June 28, 1974

Inventor(s) Gunter Keil

It is certified that error appears in the above-identified patent and that said Letters Patent are hereby corrected as shown below:

In the Heading:

After "Assignee:" change "Farbeverke" to --Farbwerke--.

Signed and sealed this 1st day of October 1974.

(SEAL)
Attest:

McCOY M. GIBSON JR.
Attesting Officer

C. MARSHALL DANN
Commissioner of Patents